E. L. SHARPNECK.
ROLLER BEARING.
APPLICATION FILED MAY 29, 1916.

1,250,367.

Patented Dec. 18, 1917.
2 SHEETS—SHEET 1.

Inventor:
Eliel L. Sharpneck.
By Henry J. Miller
atty.

E. L. SHARPNECK.
ROLLER BEARING.
APPLICATION FILED MAY 29, 1916.

1,250,367.

Patented Dec. 18, 1917.
2 SHEETS—SHEET 2.

Inventor:
Eliel L. Sharpneck.
By Henry J. Miller
atty

UNITED STATES PATENT OFFICE.

ELIEL L. SHARPNECK, OF WINTHROP, MASSACHUSETTS.

ROLLER-BEARING.

1,250,367.   Specification of Letters Patent.   Patented Dec. 18, 1917.

Application filed May 29, 1916. Serial No. 100,627.

*To all whom it may concern:*

Be it known that I, ELIEL L. SHARPNECK, of Winthrop, in the county of Suffolk and State of Massachusetts, a citizen of the United States, have invented new and useful Improvements in Roller-Bearings, of which the following is a specification, reference being had to the accompanying drawings, forming part thereof.

This invention has reference to improvements in roller bearings and the invention resides particularly in the cage or carrier for the rotating elements by means of which the rotatable anti-friction elements, so called, are spaced apart and are rotatably sustained.

One object of the invention is to reduce the cost of manufacture of the carriers for rotatable elements.

Another object of the invention is to provide a roller bearing of improved construction whereby advantage is obtained from bearings having surfaces condensed by previous rolling of the material so that the rotatable elements are in contact only with said surfaces.

Other objects of the invention will appear from the following description.

The invention consists in the novel sheet metal carrier for the rotatable elements.

The invention also consists in such other novel features of construction and combination of parts as shall hereinafter be more fully described and pointed out in the claim.

Similar characters of reference designate corresponding parts throughout.

In carrying this invention into practice I take a sheet or strip of sheet metal or material of suitable width and length rolled or pressed in any known manner to a suitable thickness and retaining at its surfaces the characteristics of density resulting from such rolling or pressing. This sheet or strip of material is now supplied with a series of parallel cuts or slits $a$, $a$ which are spaced apart at distances determined somewhat by the diameter of the rotatable elements to be used in combination therewith and also by the proposed spacing apart of said rotatable elements. At the ends of the slits $a$, $a$ I form the slits $b$, $b$ the general extension of which is transverse to the slits $a$, $a$ and the purpose of which is to separate the material at the sides of and extending back from said slits $a$, $a$ from the ends or webs 7, 7 of said material whereby said material may, at its edges defined by the slits $a$, $a$, be bent outward from the original plane of the material to constitute lips 8, 8 which, ultimately, are shaped transversely to bear against a portion of the periphery of the proposed bearing or rotatable elements.

Figure 4:
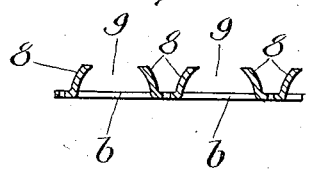
Fig. 4, represents a sectional view as taken on line 4—4 Fig. 3 after another step in the course of manufacture.
Figure 5:
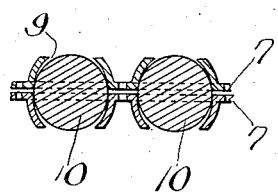
Fig. 5, represents a detail view to illustrate a step in the assembling of some of the parts.
Figure 6:
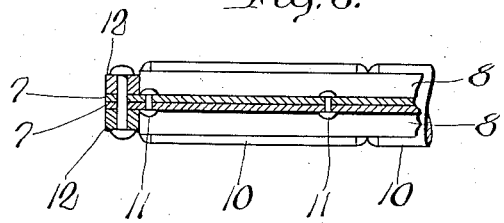
Fig. 6, represents a fragmentary sectional view as taken on line 6—6 Fig. 1.

At some stage in the course of manufacture a pair of the sheets of material having the bent lips 8, 8 and spaces or pockets 9, 9 between said lips, as shown in Fig. 4, are brought toward each other and rotatable elements, rolls 10, 10 are placed in the pockets defined by the pairs of lips 8, 8 of the respective sheets of material so that said elements 10, 10 are rotatably sustained between said pairs of lips. Said plates or strips of material are now secured together at points between said lips 8, 8 as by the rivets 11, 11.

Figure 1:
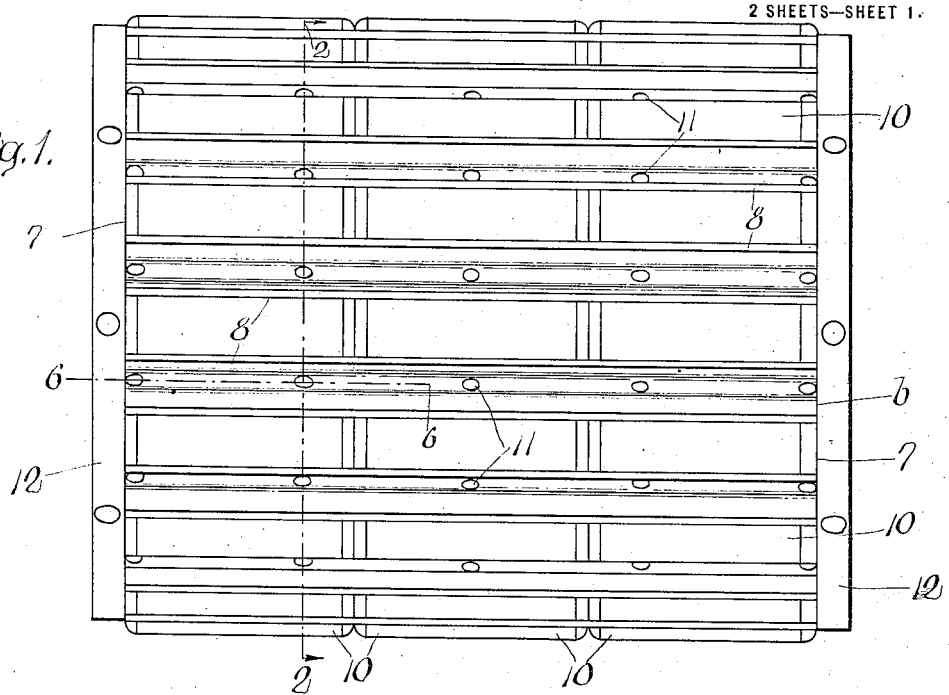
Figure 1, represents the improved bearing in side view.
Figure 2:
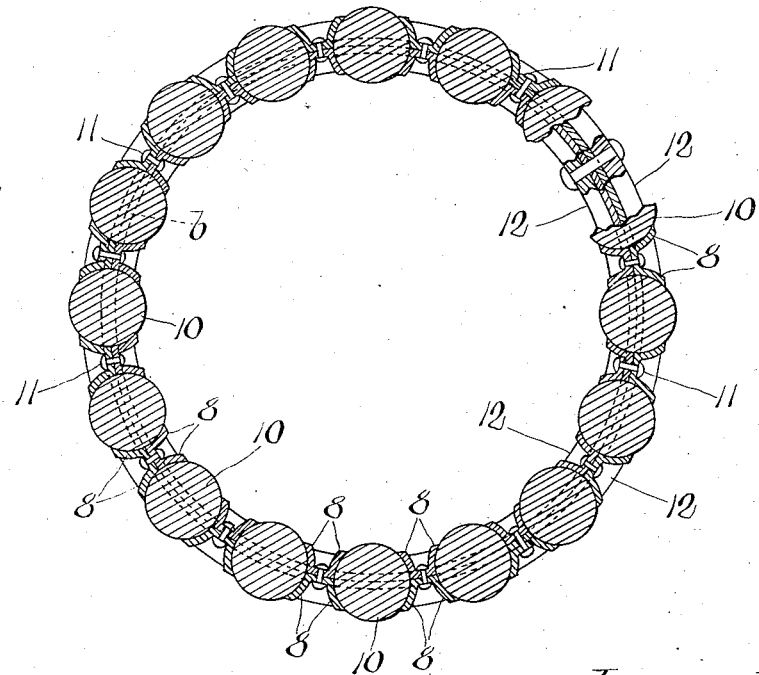
Fig. 2, represents an end view of the same parts thereof being shown in section as on line 2—2 Fig. 1.
Figure 3:
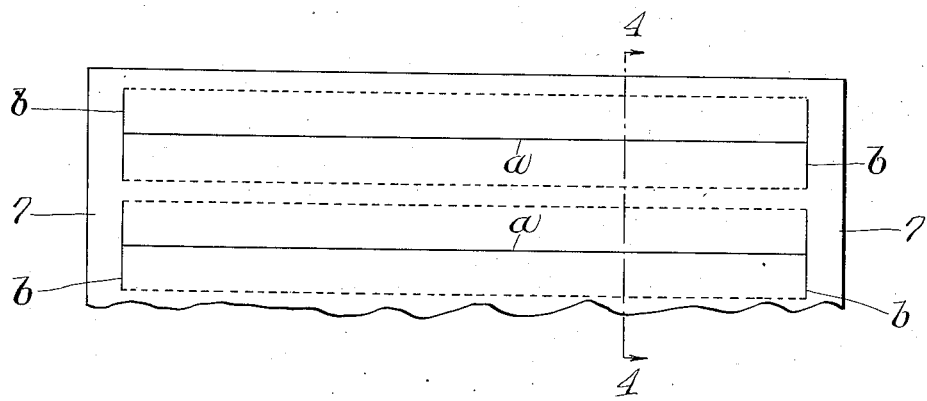
Fig. 3, represents a plan view of a piece of material adapted ultimately to constitute a member of the cage or carrier and illustrating a step in its manufacture.

When this improved bearing is intended to receive a shaft or other cylindrical device the plates or strips constituting the cage may be brought to the desired shape before they are assembled with the rotating elements. It is also evident that several of the plates may be secured together with edges of certain of said plates in overlapping relation as shown in Fig. 2.

Preferably the webs 7, 7 of the respective plates when brought together, as above described, are secured between rings 12, 12 which are fastened together by rivets as shown in the drawings. The edges of said webs 7, 7 constituted by the cuts or slits $b$, $b$ extend transversely across the ends of rolls 10, 10 and receive the thrust of these rolls.

It is of course evident that the lips 8, 8 may be subjected to any ordinary treatment to harden the same after they are bent to the desired shape.

Having thus described my invention I claim as new and desire to secure by Letters Patent—

A bearing comprising a roll sustaining cage constituted by a pair of annular sheet metal members secured together at their ends by inner and outer rings riveted to said members, said members having series of lips cut and bent therefrom in substantially opposite directions to provide bearing pockets extending longitudinally of said cage, rolls journaled in said pockets, said members secured together on lines intermediate of said pockets by rivets.

ELIEL L. SHARPNECK.